United States Patent [19]
Fletcher et al.

[11] B 3,914,991

[45] Oct. 28, 1975

[54] STRAIN GAGE MOUNTING ASSEMBLY

[76] Inventors: James C. Fletcher, Administrator of the National Aeronautics and Space Administration, with respect to an invention of Robert H. Silver, Los Angeles; Sarkis H. Kalfayan, La Canada, both of Calif.

[22] Filed: July 24, 1973

[21] Appl. No.: 382,261

[44] Published under the Trial Voluntary Protest Program on January 28, 1975 as document no. B 382,261.

[52] U.S. Cl. .............................. 73/88.5 R; 338/6
[51] Int. Cl.² ........................................... G01B 7/18
[58] Field of Search .... 73/88.5 R; 33/147 D, 148 D, 33/DIG. 13; 138/4, 6

[56] References Cited
UNITED STATES PATENTS

| | | | |
|---|---|---|---|
| 1,528,627 | 3/1925 | Peters | 73/88.5 R X |
| 2,050,106 | 8/1936 | Lurig et al. | 73/88.5 R X |
| 2,666,262 | 1/1954 | Ruge | 33/148 D |
| 2,722,587 | 11/1955 | Buzzetti et al. | 73/88.5 R X |
| 3,009,126 | 11/1961 | Pfann | 73/88.5 R X |
| 3,082,621 | 3/1963 | Soderholm | 73/88.5 R X |

*Primary Examiner*—Charles A. Ruehl
*Attorney, Agent, or Firm*—Monte F. Mott; Wilfred Grifka; John R. Manning

[57] ABSTRACT

A strain gage assembly has a pair of mounting collars that are adapted to be attached to an object under stress such as a corrosion resistant glass container for volatile material. A rigid member is cantilevered from one of the mounting collars to extend towards the other mounting collar. A resilient metal strip is supported and compressed between the cantilevered member and the other mounting collar. A strain measuring device is mounted on the metal strip. An adjustable stud member can be mounted on either one of the mounting collars or the cantilevered member to permit a compression strain to be applied to the resilient metal strip. The total strain displacement between the two mounting collars is translated to the metal strip to provide an amplification of strain.

13 Claims, 3 Drawing Figures

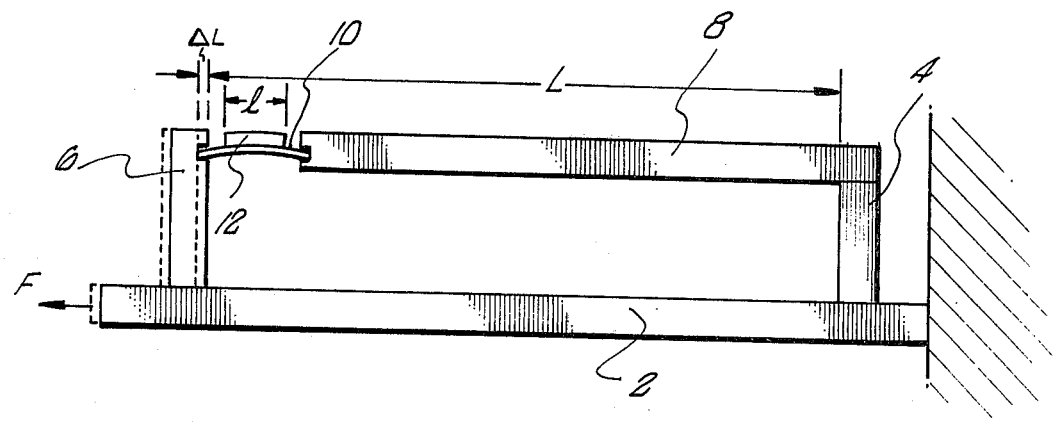
FIG_1.
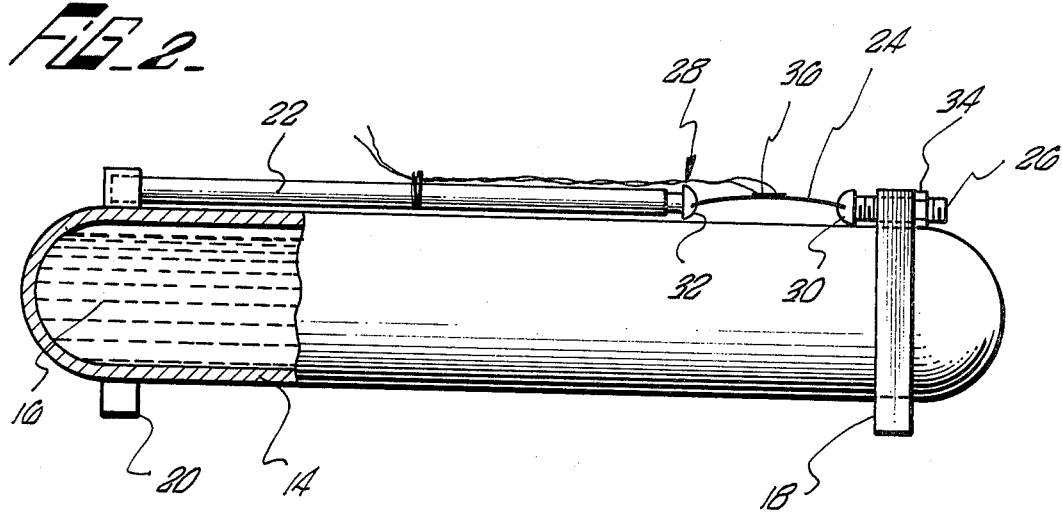
FIG_2.
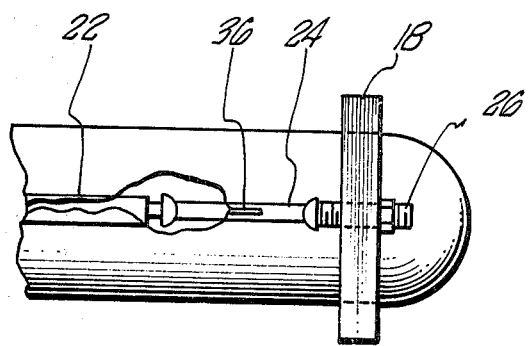
FIG_3.

STRAIN GAGE MOUNTING ASSEMBLY

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (72 Stat. 435; 43 U.S.C. 2457).

2. Field of the Invention

This invention generally relates to a strain gage assembly for measuring strain in an object and more particularly, to a mounting of the strain gage assembly on a container to monitor its internal pressure whereby an amplification of the total strain displacement applied to the strain gage is possible.

3. Description of the Prior Art

Strain gages have been used extensively in stress analysis of a large number of structural and machine parts in the prior art. Accurate stress measurement is often necessary, especially in containers having a low safety factor or a relatively small deformation. For example, in monitoring the internal pressure condition of a corrosion resistant container of glass or ceramic, there have been attempts to mount various types of strain gages directly on the surface of the container rather than resort to various forms of pressure gages. These containers are capable of storing relatively unstable material that is highly corrosive.

An example of such a volatile material is a rocket fuel known as hydrazine ($N_2H_4$). Hydrazine has a tendency to form a gas either by evaporation or chemical reaction with surrounding material. This formation of a gas correspondingly increases the inside pressure of the storage container. The container is physically deformed by this pressure and in most cases, the measurement of the strain condition of the container will indicate the condition of the volatile rocket fuel.

The permissible strain displacement for a glass container in tension is relatively small and a strain gage mounted directly on the glass surface has to be extremely sensitive and very carefully mounted to measure this displacement. Frequently, the glass container will be heat sealed and it is often necessary to remove the gage prior to the heat sealing or to take special precautions to protect the gage while it is attached directly to the glass. These precautions are usually relatively expensive.

Since the storage of the volatile material is frequently for an extended period of time, it is often necessary to calibrate the gage and this has proven to be relatively difficult when it remains mounted on the glass surface.

Customarily, if the glass container is defective, the permanently mounted strain gage would be simply discarded with the container. In addition, the heat insulating characteristics of the glass necessitated a relatively lower excitation voltage to keep any generated heat within the temperature sensitivity range of the strain gage.

Attempts have been made in the prior art to provide various forms of strain gage mounting assemblies to increase the sensitivity of the strain gages. For example, the Lovelace U.S. Pat. No. 3,444,499 provides a mounting configuration that applies a total strain summed over a larger distance than the actual gage length distance to the strain gage. The Lovelace mounting structure requires a particular H-shaped mounting block that introduces an error into the strain measurement based on the amount of work necessary to deform the H-shaped mounting block.

The Schultheis, Jr. U.S. Pat. No. 3,411,348 discloses an elongated flexure member that is rigidly secured at one end to the specimen to be measured and supported at the other end on a roller so that only bending deflections will produce linear readings. The Kutsay U.S. Pat. No. 3,599,479 utilizes a strain gage mounting member designed to measure bending stress. The Mason U.S. Pat. No. 3,102,420 is designed primarily to compensate for the non-linear response of a piezoresistive gage. Finally, the Andersson et al. U.S. Pat. No. 3,554,025 provides a strain gage that is insensitive to bending moments applied to the test structural element.

OBJECTS AND SUMMARY OF THE INVENTION

It is a primary object of the present invention to provide a strain gage assembly that can measure relatively small strains by multiplying the deformation applied to the strain gage.

It is another object of the present invention to provide a strain gage assembly that may be effectively utilized to monitor the pressure condition of a material stored in a container.

It is a further object of the present invention to provide a mounting assembly that is relatively inexpensive.

It is yet another object of the present invention to provide a detachable and portable mounting for a strain gage.

It is yet a further object of the present invention to provide a mounting device that is adjustable when fixed to the test object.

Briefly described, the present invention involves a strain gage device that is mounted in compression between a pair of mounting collars. The particular mounting arrangement translates the total strain displacement of the object or container under test between the mounting collars to apply it across the smaller gage length distance thus attaining a mechanical multiplication or amplification.

More particularly, the subject invention includes a pair of mounting collars that are rigidly attached to the object or container at two separate points on the container. A cantilevered rigid member is mounted on one of the collars and extends above the surface of the container and towards the other mounting member. A relatively resilient metal strip is supported between the cantilevered rigid member and the other mounting collar. The metal strip carries means for measuring strain displacement such as a wire, foil or piezoresistive gage. Means is provided for varying the relative position and stress of the resilient metal strip in accordance with a predetermined calibration whereby the relatively rigid member can translate the total strain displacement of the object between the mounting members and thus provide an effective amplication of the strain under measurement.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a schematic diagram illustrating the principles of the strain gage in accordance with the present invention.

FIG. 2 is a side view in partial cross section of the strain gage of the present invention.

FIG. 3 is a partial plan view disclosing the mounting of the strain gage of the present invention of FIG. 2.

DESCRIPTION OF THE PREFERRED EMBODIMENT

Referring to FIG. 1 of the drawings, an illustrative embodiment of the broad general principles of the present invention is disclosed wherein a test specimen 2 is subjected to a force F. Mounted on the test specimen 2 are mounting members 4 and 6. Mounting member 4 carries a cantilevered relatively rigid beam 8. A flexible resilient member 10 carrying a strain measuring device 12 of length l is mounted in compression between one end of the rigid beam 8 and the mounting member 6.

The total distance between the mounting members 4 and 6 in an unstrained state is disclosed as L in FIG. 1. Upon the application of the tension force F, the test specimen 2 undergoes a deformational elongation which may be assumed to be ΔL. The actual thickness and curvature of the flexible resilient member 10 has been exaggerated for purposes of illustration in FIG. 1.

When the test specimen 2 is elongated in response to the application of force F, the amount of compression in the flexible resilient member 10 is accordingly decreased and its radius of curvature will increase. This total deformation ΔL is translated directly to the flexible beam 10 thereby amplifying the measurable deformation to the strain measuring device 12 by the ratio of total length L between the mounting members 4 and 6 to the actual strain measuring device length l. The strain measuring device 12 is capable of measuring any variance in resistance which can be appropriately monitored by methods well known in the prior art.

It should be realized that while the disclosure refers to a single strain gage for illustrative purposes, that it is quite possible to use four or more gages mounted on the flexible beam 10. The output voltage of these four or more gages can be summarized to provide an electrical amplification; that is, the individual output voltages of each gage are simply combined to increase the relative total measurable voltage. This use of a plurality of strain gages is well known in the prior art as illustrated in U.S. Pat. No. 3,599,479.

Generally, strain measuring devices 12 have a relatively low electrical output in the range of millivolts. It is frequently found that when measuring small strains; e.g. less than 100 microinches or microstrain, anomalies in the mounting of the strain measuring device 12 can cause noise in output data that can be so great as to make it difficult to determine the actual strain in the test specimen 2. Thus, the amplification of deformation over the length l illustrated in FIG. 1 provides the strain measuring device 12 with more than an adequate sampling ot the actual strain experienced by the specimen 2.

Referring to FIG. 2 and FIG. 3, a hermetically sealed glass container 14 is used as a pressure vessel to store a volatile material 16. The fuel 16, whether solid or liquid, has a characteristic of varying its pressure over a period of time and accordingly, it is necessary to monitor the actual pressure within the container. Frequently, an increase in pressure will result from gas evolution at constant temperatures. The material 16 can also be corrosive thus requiring the use of glass.

If a strain measuring device 12 was mounted directly on the surface of the glass container 14, it would experience a relatively small deformation across the gage length and produce a correspondingly low elecrical output. The glass container 14 is only capable of limited tensile stress and thus it becomes critical to provide an accurate monitoring of the pressure condition of material 16 with only a relatively small deformation of the glass container 14.

The present invention accomplishes this measurement of small strain deformations by providing a pair of collar members 18 and 20 that can be rigidly attached about the surface of the glass container 14. The attachment can be effectuated by mechanical means or by an appropriate adhesive such as an epoxy resin adhesive. The collars 18 and 20 are generally made from a metal such as aluminum or steel but can be made from other material such as plastic if desired. The configuration of the collars 18 and 20 can vary since it is only necessary that the base of the collars can be rigidly attached to the container surface. Generally, the container surface is sandblasted and cleaned before fastening the collars 18 and 20. A relatively rigid cantilevered beam or rod 22 having a cylindrical shape extends from the mounting collar 20. The cylindrical shape is illustrative only and should not be considered limiting. A flexible metal strip 24 is placed in compression between the rigid beam 22 and an adjustable stud member 26 that is mounted on the collar member 18. The relative rigidity of the rigid beam or rod 22 is with respect to the flexible metal strip 24 so that there is a negligible deformation when compared to the relative deformation of the thin metal strip 24.

In one preferred embodiment, a second adjustable stud member 28 can be mounted at one end of the rigid beam 22. Both adjustable stud members 26 and 28 have respective heads 30 and 32 with slots adapted to receive the ends of the metal strip 24. A locking bolt 34 can be mounted on the adjustable stud member 26 to secure its position. The adjustment of both stud members 26 and 28 can be effectuated by appropriate threads on the stud members that can coact with appropriately threaded bores in the collar member 18 and in the rigid beam 22.

Mounted on the thin, resilient metal strip 24 is an appropriate strain measuring device 36. For purposes of convenience, only a single strain measuring device or gage 36 is disclosed in FIG. 2.

The particular mounting of the collar members 18 and 20 on the surface of the glass container 14 plus the relative rigidity of the beam 22 is capable of translating the total deformation of the glass container 14 between the two collar members 18 and 20 to the metal strip 24. The rigid beam 22 extends parallel to the longitudinal axis of the glass container 14 and above the surface of the glass container 14. This strain deformation is applied directly to the metal strip 24 that has been precalibrated to provide an optimum linear reading of the gage 36. The glass container 14 is subject to a tensile stress and a corresponding strain elongation which when applied to the metal strip 24 will decrease the compression strain and the radius of curvature of the metal strip 24. The adjustable stud member 26 like the rigid beam 22 is relatively rigid compared to the thin metal strip 24.

In the embodiment disclosed in FIG. 2, it is possible to generate an amplification of strain measurement that is a ratio of the distance between the mounting collars 18 and 20 to the effective length of the strain measuring gage 36 compared to the strain measurement that gage 36 would normally experience if mounted directly on the glass surface. In addition, since the strain measuring device 36 is mounted in compression, the release of that compression energy does not introduce any error in the reading of the strain displacement through any work deformation of a mounting member. Thus, the inherent error that is generally introduced by mounting members that are deformed in the prior art is eliminated in the present invention.

The strain measuring device 36 can comprise a foil or wire mounted in epoxy or lacquer to the metal strip 24 or it can comprise a piezoresistive displacement sensor as known in the prior art. The metal strip 24 is removably mounted in the slots of the respective mounting heads 30 and 32. Thus, it is a simple matter to replace a defective strain measuring gage 36 or even, if necessary, to calibrate the strain measuring gage 36. In addition, if the glass container 14 is proven to be defective, the rigid beam 22 and the metal strip 24 with the strain measuring gage 36 can be salvaged.

It should be noted with respect to calibration, that it is not necessary to calibrate the strain measuring gage 36 by pressurizing the container prior to sealing. The metal strip 24 carrying the strain measuring device 36 can be simply removed and calibrated independently. It is then subsequently replaced in the adjustable stud members 26 and 28 and compressed to a pre-calibrated value in the linear range of the measuring device 36.

The strain measuring gage 36 can be easily removed prior to any heat sealing of the hermetically sealed glass container 14. This eliminates the special precautions that were required in the prior art to protect the strain measuring gages that were attached directly to the glass surface. Further, since most state-of-the-art strain gages are mounted on metal, the mounting cost can then be considerably reduced as compared to a mounting of the gages directly on the glass surface. Finally, because the thin metal strip 24 is capable of providing excellent heat dissipation especially when the rigid beam 22 and the adjustable stud member 26 serve as heat sinks, higher excitation voltages can be used than with a strain gage mounted directly on the glass surface.

While the above embodiment has been described particularly with a glass container, it should be realized that the present invention is capable of being utilized on any object, such as structural and machine parts, to provide an extremely sensitive strain measurement.

While a preferred embodiment of the present invention has been described hereinabove, it is intended that all matter contained in the above description and shown in the accompanying drawings be interpreted as illustrative and not in a limiting sense and that all modifications, constructions, and arrangements which fall within the scope and spirit of the invention may be made.

What is claimed is:

1. A strain gage assembly for measuring strain in an object comprising:
    a pair of mounting members capable of being rigidly attached to the object at two separate points on the object;
    a rigid member mounted on one of the mounting members and extending towards the other mounting member;
    a resilient strip member removably mounted in compression between the rigid member and the other mounting member;
    means mounted on the resilient strip member for measuring strain, and
    variable means for providing a predetermined amount of compression strain in the resilient strip member whereby the mounting of the rigid member and the first and second mounting members translates the total strain deformation of the object between the mounting members to the resilient strip member to vary a portion of the compression stress which is measured by means for measuring strain.

2. The strain gage of claim 1 wherein the mounting members are a pair of collars adapted to be positioned around the object.

3. The strain gage of claim 1 wherein the variable means for providing a predetermined amount of compression strain in the resilient strip member is a threaded stud adjustably mounted on the other mounting member, the stud having a slot at one end for receiving one end of the resilient member.

4. The strain gage of claim 1 wherein an epoxy resin fixedly attaches the mounting members to the object.

5. The strain gage of claim 1 wherein the rigid member is a cylindrical beam extending above and relatively parallel to a longitudinal axis of the object.

6. The strain gage of claim 1 wherein the rigid member is a cylindrical beam and the variable means for providing a predetermined amount of compression strain includes a threaded stud mounted on the cantilevered end of the beam, the stud having a slot to receive the resilient member.

7. The strain gage of claim 1 wherein the mounting members are a pair of collars positioned around the object and the means for providing a predetermined amount of compression strain in the resilient member includes a threaded stud adjustably mounted on the other mounting member, the stud having a slot at one end for receiving one end of the resilient member.

8. The strain gage of claim 7 wherein the means for providing a predetermined amount of compression strain in the resilient member further includes a second threaded stud adjustably mounted on the rigid member.

9. The strain gage of claim 8 wherein the means for measuring strain is a foil strain gage.

10. The strain gage of claim 8 wherein the means for measuring strain is a piezoresistive semi-conductor gage.

11. In a corrosion resistant container such as a glass container for storing material subject to pressure variances, the improvement comprising a strain gage means for monitoring the internal pressure of the container, including:
    a first and second mounting collar rigidly fastened to the container at two separate points on the container;
    a rigid cantilevered member mounted on the first mounting collar and extending parallel and above the container surface towards the second mounting collar;

a resilient metal strip mounted in compression between the rigid member and the second mounting collar;

means mounted on the resilient metal strip for measuring strain, and variable means for providing a predetermined amount of compression strain in the resilient metal strip whereby the mounting of the rigid member and the first and second mounting collars translates the total strain displacement of the container between the mounting collars to the metal strip to relieve a portion of the compression strain which is measured by the means for measuring strain as an indication of container pressure.

12. The invention of claim 11 wherein the variable means for providing a predetermined amount of compression strain includes an adjustable stud member mounted on the second mounting collar, whereby the total strain displacement is greater than the strain displacement capable of being measured by the means for measuring strain if mounted directly on the surface of the container.

13. The invention of claim 12 wherein the adjustable stud member has a slot at one end for removably receiving one end of the metal strip.

* * * * *